Patented Apr. 7, 1942

2,279,267

UNITED STATES PATENT OFFICE 2,279,267

DEENAMELING PROCESS

Harry C. Kremers, Cleveland Heights, Ohio, assignor to The Harshaw Chemical Company, Elyria, Ohio, a corporation of Ohio No Drawing. Application December 7, 1940, Serial No. 369,137

6 Claims. (Cl. 148—8)

This invention relates to removal of vitreous enamel from bodies coated therewith and has for its object to provide a more convenient and more satisfactory process for the removal of such enamels than has been available heretofore.

The need for a de-enameling process arises mainly in the fact that a percentage of enameled articles are found to be imperfect as soon as the enameling step in their manufacture is completed, and it is cheaper to remove the imperfect enamel and re-enamel the article than to discard it. Presently used methods of de-enameling are such as boiling in aqueous caustic, dipping in fused caustic and treating with aqueous HF. These methods are effective but not completely satisfactory since expensive equipment is required, the steel base is sometimes corroded and the bath is in all such cases progressively contaminated by the building up therein of the products of the reaction.

I have now discovered that removal of vitreous enamels can be accomplished by contacting enameled bodies with gaseous HF.

In the preferred practice of the invention, I first enclose the enameled bodies in a suitable reaction chamber, suitably composed of iron or steel, and provided with an inlet for the gas and an outlet opening for venting, the inlet and vent preferably being located at opposite ends of the reaction chamber so as to avoid loss of gas as far as possible. I prefer also to provide for draining condensed, liquid products of the reaction from the reaction chamber. After the reaction chamber is loaded with the work to be de-enameled, the gas, anhydrous HF, is passed in at a rate such that most of it is consumed in the reaction and only a small proportion escapes through the vent.

The principal reaction is that between HF and $SiO_2$ or a compound of $SiO_2$ resulting in the formation of $SiF_4$ and $H_2O$. $SiF_4$ escapes as such through the vent, or in part reacts with HF and water to form a strong aqueous solution of $H_2SiF_6$. The water produced by the reaction may escape partly as steam and partly as $H_2SiF_6$ and solvent therefor. Minor reactions are between HF and alkali oxides, and HF with oxides of alkaline earths, alumina, antimony, titania, etc.

Some of the reaction products are solids and to a considerable extent remain on the body being de-enameled, such as metal shapes, in the form of a weakly adherent coating. After the reaction has proceeded for a sufficient time, the solid matter may be flushed or brushed off, no very great force being required.

Example

A reaction chamber consisting of an iron box 6" x 8" x 54" and provided with a gas inlet at one end and a vent at the other was loaded with small enameled sheet steel pieces aggregating approximately thirty square feet of enameled surface. These pieces were spaced apart approximately ¾". Anhydrous HF gas was passed in at the rate of about 2 lbs. per hour. After about 3 hours, six to eight pieces nearest the front or gas inlet end were removed, the remaining pieces were advanced and additional pieces were added at the rear end. Every two hours, another six to eight pieces were removed from the front end and replaced by addition of the same number at the rear. For sixty square feet of enameled surface thus de-enameled, the weight of enamel being from 40 to 60 grams per square foot, the HF consumption was approximately 0.22 lb. per square foot, approximately 1.5 lbs. HF per lb. of enamel removed. The reaction chamber was tilted slightly rearwardly whereby the liquid reaction products which condensed in the reaction chamber were drained off. Approximately 90% of the HF used was theoretically required for the reaction with the enamel removed. The so-treated pieces were freed from the weakly adherent solids by brushing and then washed and placed in a neutralizing solution. The metal was found to be unharmed and could be re-enameled exactly like new work and with fully satisfactory results.

Having thus described my invention, what I claim is:

1. A process of removing vitreous enamel from an enameled body comprising contacting such enameled body with gaseous, anhydrous HF.

2. A process of removing vitreous enamel from a metallic body coated therewith comprising subjecting said body to an atmosphere of anhydrous HF.

3. A process of removing vitreous enamel from enameled bodies comprising confining such bodies in an enclosed space, introducing gaseous, anhydrous HF into such space and into contact with such bodies until the attack on the enamel has penetrated entirely therethrough and then physically removing from such bodies the residual, weakly adherent, solid material.

4. A process of removing vitreous enamel from enameled bodies comprising confining such bodies in an enclosed space, introducing gaseous, substantially anhydrous HF into such space and into contact with such bodies until the attack on the enamel has penetrated entirely therethrough and then physically removing from such bodies the residual, weakly adherent, solid material.

5. A process of de-enameling bodies coated with vitreous enamels comprising enclosing such bodies in a substantially closed chamber and introducing into such chamber gaseous, substantially anhydrous HF.

6. A process of removing vitreous enamel from metal bodies enameled therewith including the steps of enclosing such bodies in a substantially closed chamber and passing gaseous, anhydrous HF into said chamber at a rate not greatly exceeding the rate at which it is consumed in the reaction with the enamel on such bodies.

HARRY C. KREMERS.